Jan. 4, 1927.　　　　　　　　　　　　　　　1,613,233
O. H. LUDEMAN ET AL
SEPARATOR
Filed May 18, 1922　　　5 Sheets-Sheet 1
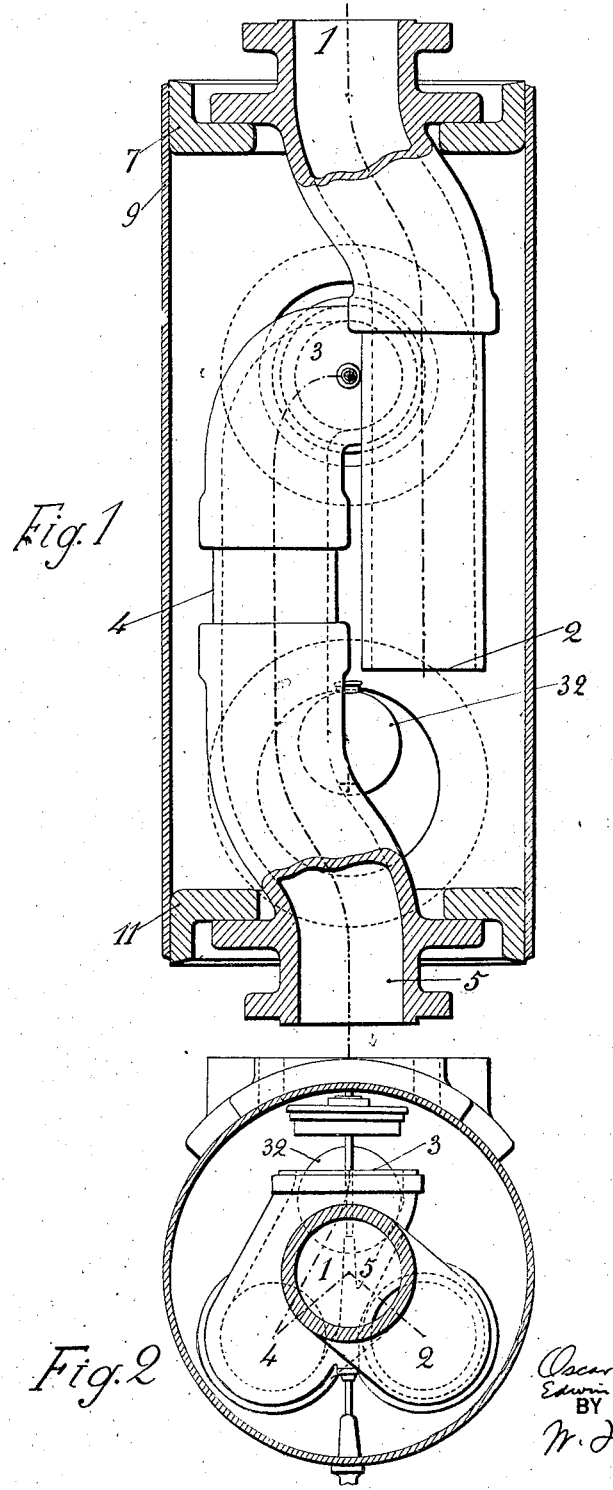

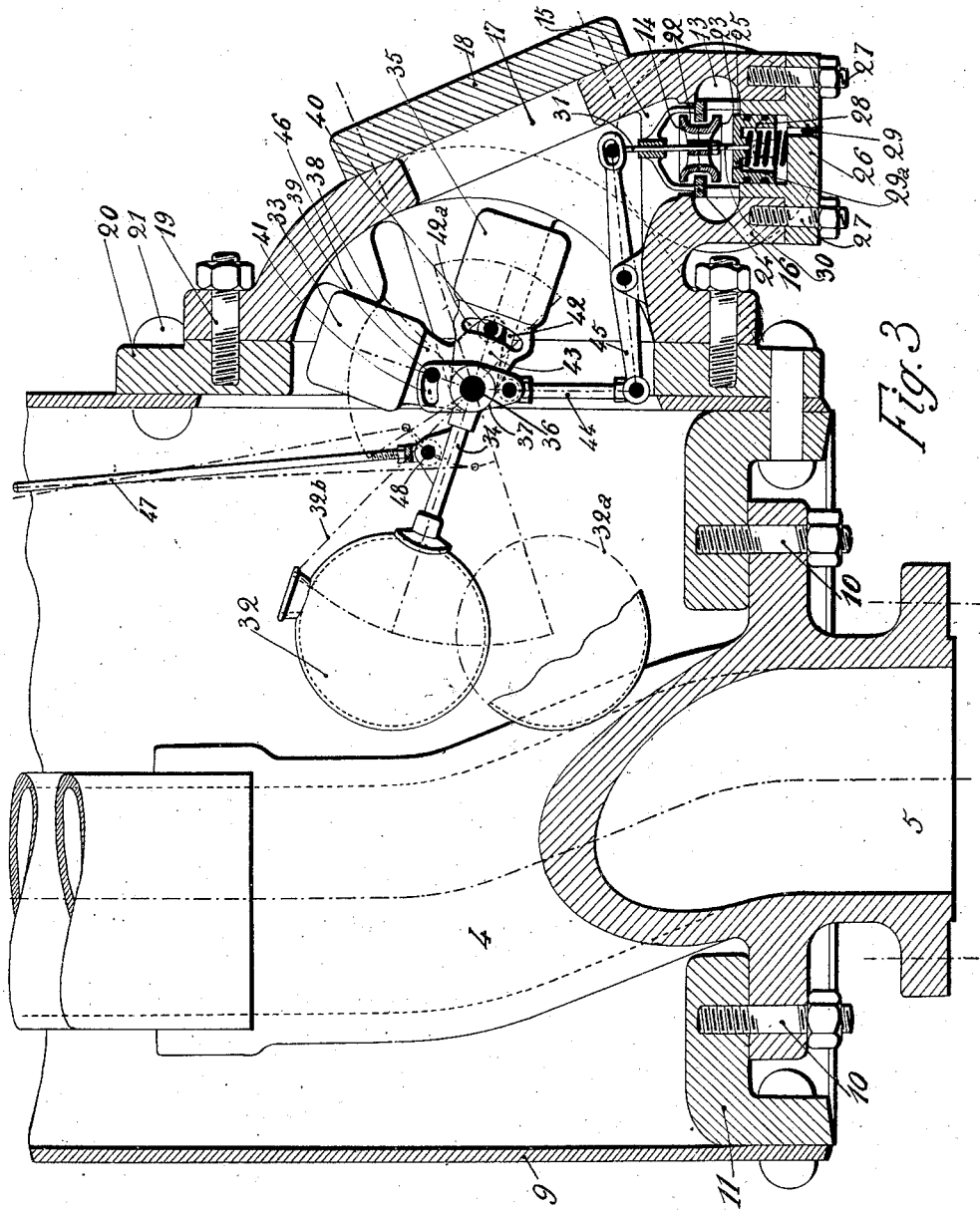

Jan. 4, 1927. 1,613,233
O. H. LUDEMAN ET AL
SEPARATOR
Filed May 18, 1922 5 Sheets-Sheet 4
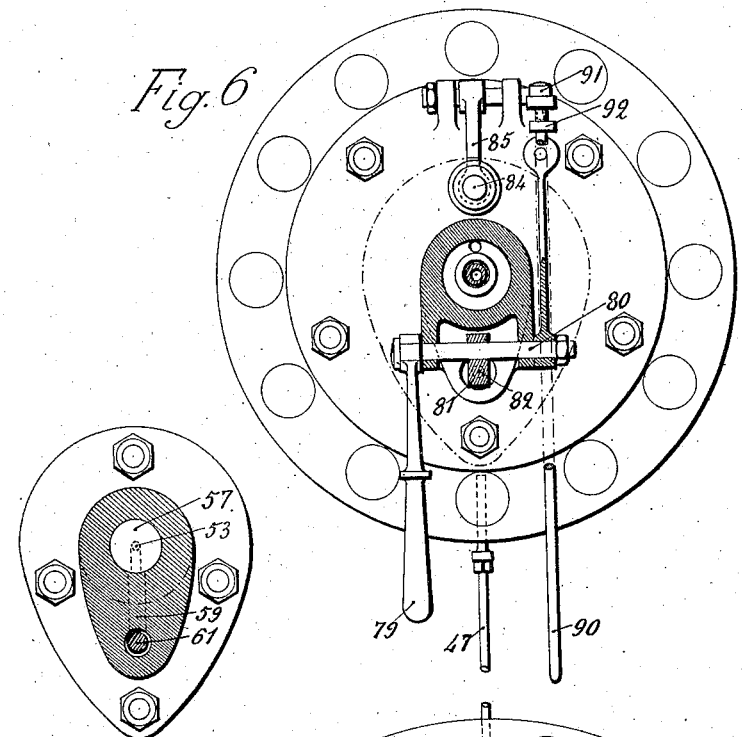
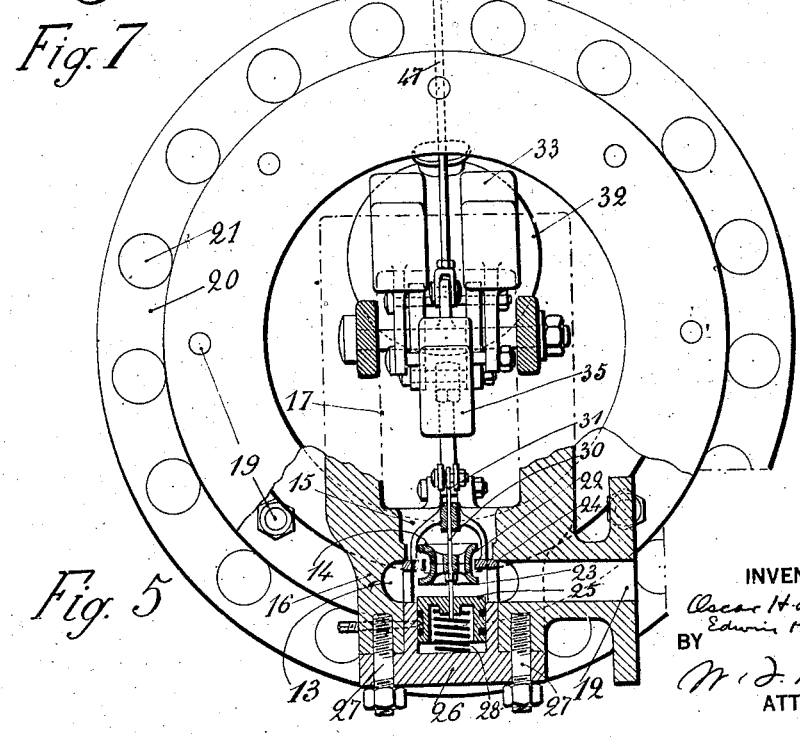
INVENTORS
Oscar H. Ludeman
Edwin H. Ludeman
BY
ATTORNEY

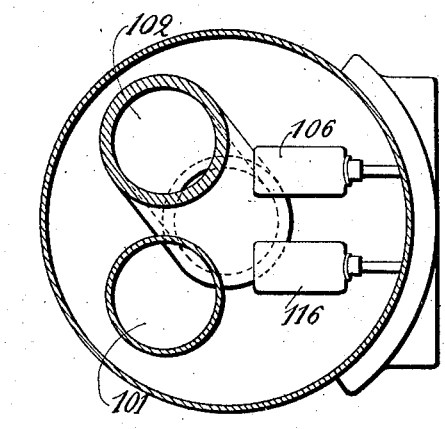
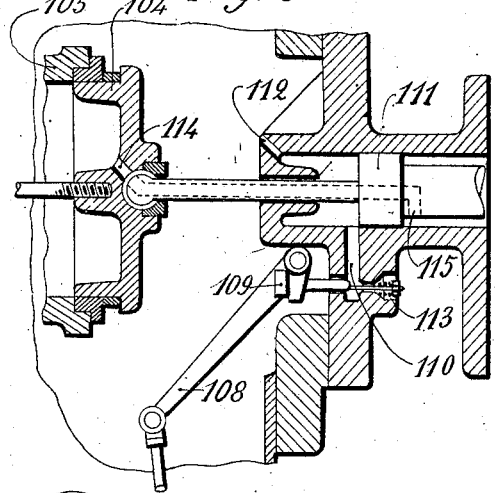
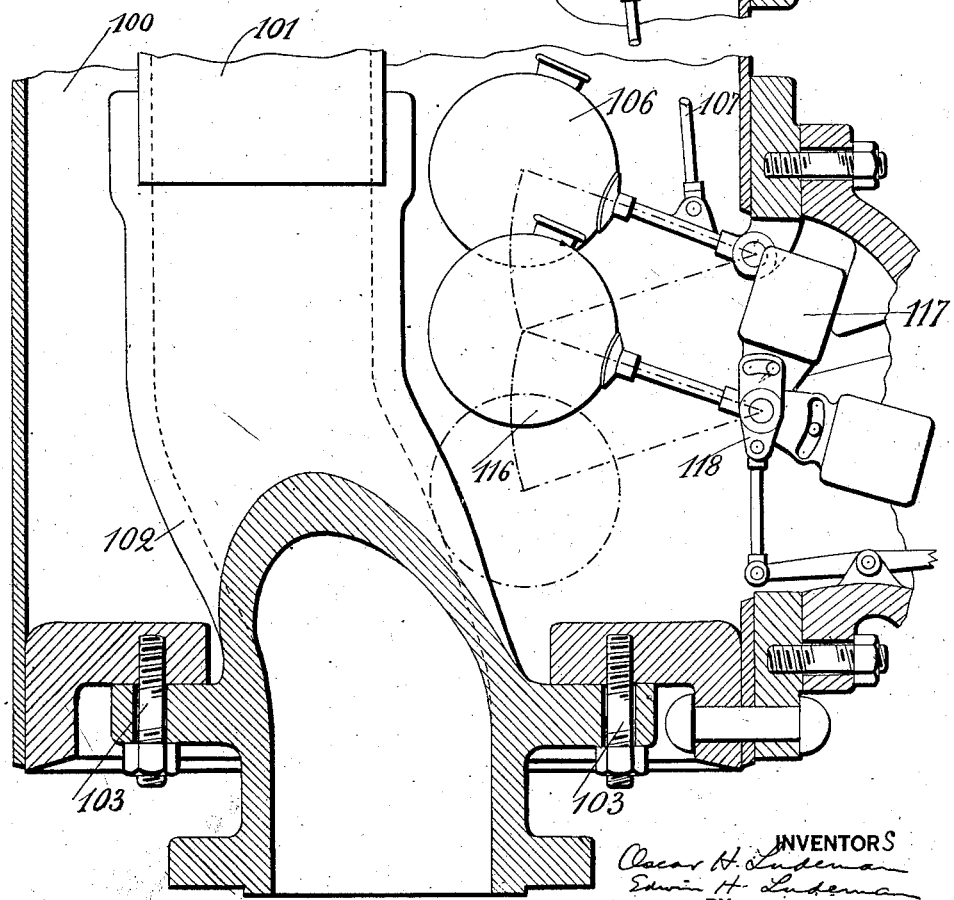

Patented Jan. 4, 1927.

1,613,233

UNITED STATES PATENT OFFICE.

OSCAR H. LUDEMAN, OF GLEN RIDGE, NEW JERSEY, AND EDWIN H. LUDEMAN, OF BROOKLYN, NEW YORK.

SEPARATOR.

Application filed May 18, 1922. Serial No. 561,786.

This invention relates to separators used for separating water from steam or liquids from gases and more particularly to a separator interposed in the steam line, between the boiler and the steam using apparatus, as for example a steam engine or heating apparatus, and provided with means for shutting off the steam when water accumulates too rapidly in the separator.
One of the objects of the invention is to provide a steam separator having a tank with an automatic stop valve for shutting off the steam to the engine, the said valve being actuated by motive power within the separator and separate from the float as for example by means of a weight or steam or electric power motor, the operation of the motive power being controlled by means of a float and connections arranged within the separator tank, the float being actuated by the accumulation of water or other liquid in the body of the separator. In one embodiment of the invention the stop valve and motor are carried by the separator and in the form of the invention illustrated the stop valve is arranged inside of the separator. The power means, such as the steam, being within the separator as well as the stop valve itself, this avoids the necessity of stuffing boxes, thus doing away with the danger of a failure to operate to close the valve when the emergency arises. This increases the safety and reliability of the apparatus.
Means are thus provided for automatically shutting off the flow of steam to the engine when excess water accumulates, the space above the water being filled with steam, which when the automatic valve is shut, acts as a cushion against the flow of the incoming water, thus protecting the engine and preventing the water from hammering the steam pipe.

In the embodiment of the invention illustrated, the springs or other means utilized in connection with the steam motor operating the shut-off valve, are arranged outside of the separator body and in such a way as not to be injured by the high temperatures and high pressures to which the device is subjected, provision being also made to avoid the use of a stuffing box in connection with the operating parts, thus doing away with constant re-packing and unreliability of action in this respect.

The separator tank contains a float which normally controls the discharge of the intercepted water thru the intermediate agency of a weight.

If, however, the water accumulates too rapidly as by entering the separator with a sudden rush, a float in accordance with the invention, thru an intermediate linkage, trips or controls means for throwing in a source of power within the separator for closing a stop valve, shutting off the flow of steam or water from the separator thru the main steam outlet.

In one particular embodiment of the invention illustrated, the float which controls the discharge of the water is also utilized to control the means for actuating the steam stop valve (altho a separate float may be used) and as illustrated the float trips a pilot valve, thus allowing the steam pressure in the separator to move a piston which actuates the stop valve to shut off the supply of steam to the engine when the water accumulates too rapidly in the separator. The pilot valve can also be tripped by a handle or by an electro-magnet, worked for example when the engine is running at too high a speed. This magnetic control will form a subject of a separate patent application.

With the above and other objects in view, the invention consists in the parts, improvements and combinations more fully pointed out hereinafter.

Referring now to the drawings which illustrate one form of separator:

Figure 1 illustrates a vertical sectional view of a separator showing the means for connecting the separator in series in the steam line;

Fig. 2 is a horizontal cross section of the separator shown in Fig. 1;

Fig. 3 is a vertical section of the lower portion of the separator showing the trap and its discharge valve for discharging the intercepted water and the means for operating it;

Fig. 5 is a detail view partly in section looking toward the weights for operating the discharge valve, with the cover plate removed;

Fig. 6 is an elevation partly in section looking toward the left of Fig. 4, showing the handles for operating the stop valve mechanism;

Figure 4:
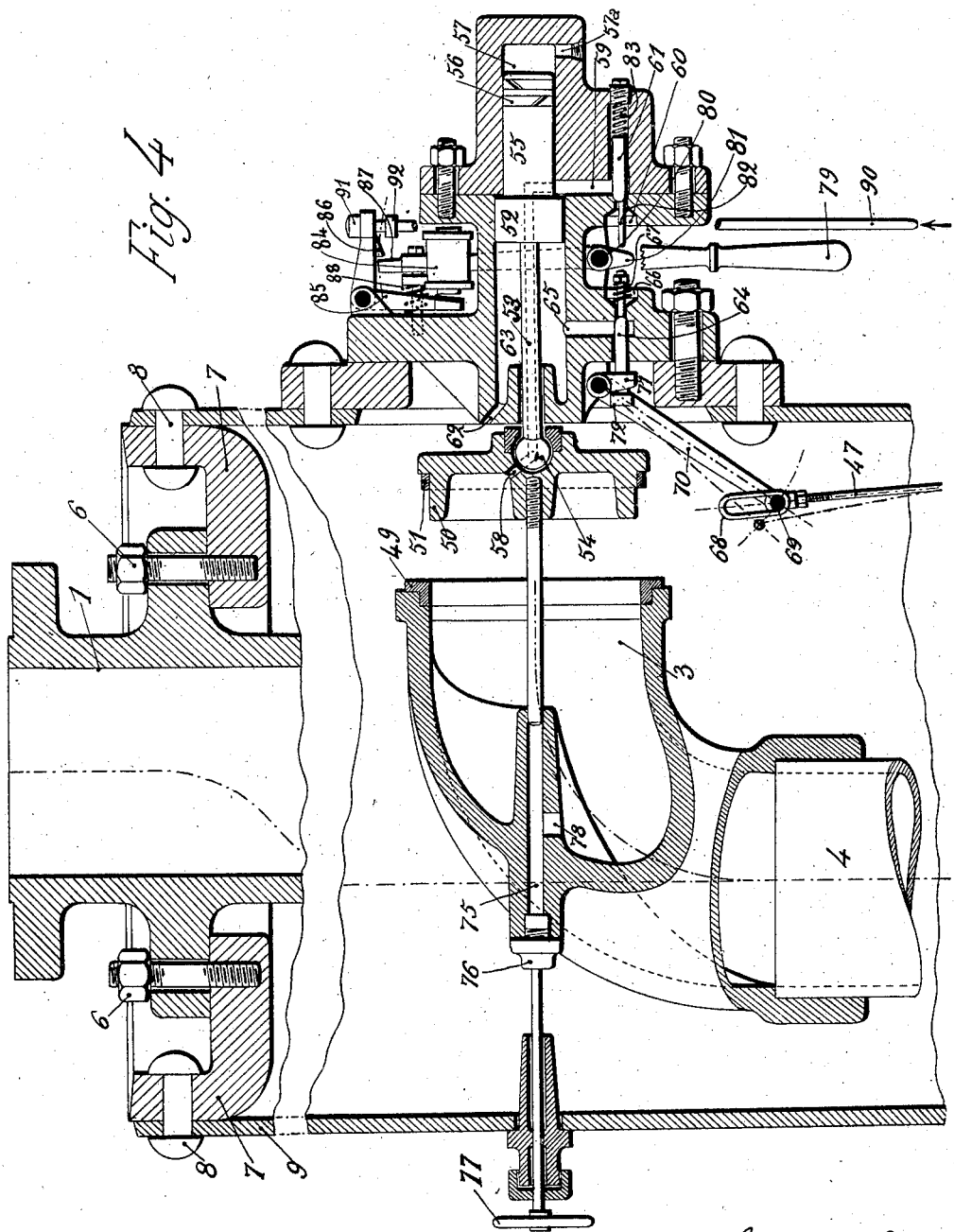
Fig. 4 is a vertical section thru the upper part of the separator showing the shut-off valve and the power means for operating it;

Fig. 7 is a vertical detail view passing thru the motor piston chamber, of Fig. 4.

Figs. 8, 9, 10 are sectional views of another form of the invention.

The steam leaving the boiler enters the separator from the steam line by means of the steam supply pipe 1 to which the steam line is connected. The separator may be either of the vertical or horizontal type and may be of any desired construction. The steam discharges into the separator at the discharge mouth 2 of the pipe 1 which in the form illustrated extends downwardly into the separator to a point near the middle of the separator.

Normally the steam leaves the separator by entering the mouth 3 of the steam discharge pipe 4 which is bent for convenience and has a discharge opening 5 connected to the steam line on the engine side. The pipe 1 may be connected to the separator in any desired manner as by means of bolts 6 passing thru flanges in the pipe head and entering an end plate 7 secured by rivet 8 to the body 9 of the separator body.

The steam discharge pipe 4 may likewise be connected to the body 9 of the separator by means of bolts 10 which secure the pipe to the end 11 riveted to the body of the separator.

The water of condensation accumulates in the bottom of the separator tank and is discharged thru a discharge valve controlling the outlet 12, thru which outlet the water of condensation is discharged. The discharge outlet 12 communicates with the valve chamber 13 in which is located the discharge valve 14, the said valve chamber being in communication with the interior of the separator body by means of passageway 15. These parts may be mounted in a casing 16 provided with a manhole 17 and cover 18, the casing being removably secured to the tank by bolts 19 which pass into a plate 20 which in turn may be riveted to the body of the separator by means of rivets 21. By removing the manhole cover or by removing the casing, all the parts of this mechanism may be readily inspected or repaired.

The valve 14 is preferably a double seating valve provided with two seating portions 22, 23, the portion 22 cooperating with the fixed valve seat 24 and the valve portion 23 cooperating with a yielding valve seat 25 so as to ensure complete closure. In the form illustrated, the valve seats 24 and 25 are carried by a removable cage 26 bolted to the casing by means of bolts 27 so that when these bolts are removed the valve mechanism may be removed. The valve seat 25 preferably takes the form of a piston backed by a spring 28, the port 29$^a$ serving as a pressure balancing port—to keep substantially the same pressure on both sides of the piston. A plug 29 permits removal of sediment.

The valve is guided by a stem 30 passing thru the piston and is operated by a stem 31 passing thru the valve cage; the stem 31 being in turn connected with an operating link mechanism.

The valve is operated thru the intermediate agency of a float and weight, the float 32 moving the weight 33 past its dead center position whereupon the weight actuates the valve thru the mechanical linkage so as to open the valve. In the form illustrated the float is made hollow so that it fills with water and remains so filled after the separator has been installed. A closed or other form of float may be employed. The float as shown, is connected by means of a rod 34 with a counterbalancing weight 35 mounted loosely upon the pivot or center 36. Upon this pivot there is also loosely mounted the link 37 and the arm 38, the latter carrying the weight 33. The arm 38 carries two pins 39, 40, which engage respectively with slots 41 and 42 in the link 37 and in the weight-carrying member 43. The link 37 is connected by mechanical connections such as connecting rod 44 and lever 45 with the valve stem 31. The weight 33 thru the agency of the pin 39 actuates the link 37 to open the valve 14, the valve being locked open by the link as follows:

When the float 32 rises by reason of the accumulation of water beneath it, during the ordinary operation of the separator, the weight 33 is toward the left of the vertical, i. e. toward the left of its position in Fig. 3. The float is normally in the dotted line position at 32$^a$ and in rising takes the position shown at 32 in Fig. 3. In so doing the end 42$^a$ of the slot 42 bears down on the pin 40, thus rocking the weight 33 toward the right of Fig. 3 until it falls and strikes and is arrested by shoulder 46. While so falling the pin 39 attached to the arm carrying the weight 33 moving in the slot 41 reaches the end of its travel in the slot and rocks the link 37 into vertical position as shown, thus straightening out the bellcrank 37, 44 into a position to raise and lock the valve 14 in open position.

When the float falls, the lower end of the slot 42, after the lost motion between the pin 40 and the slot is taken up, moves the pin 40 so as to rock the bellcrank carrying the weight to the left. When the weight passes the vertical, moving toward the left, the pin 39 connected with the weight strikes the left end of the slot 41, rocking the link 37 and breaking the toggle formed by the links 37, 44, thus lowering the valve 14 upon its valve seat so as to shut off the discharge of water.

Turning now to the stop valve feature of the invention, it will be observed that this is set into operation by an independent motor, actuated by a gravity device, steam or other source of power. The motor is controlled in its action by a float. In Fig. 3, a rod is attached to the float mechanism as by means of the pivot 48.

The steam discharge or outlet pipe 3 may be provided with a valve seat 49 with which the valve head 50 cooperates. The valve head 50 enters the pipe opening and carries a cooperating seat 51 which comes into a firm contact with the seat 49, thus shutting off the steam supply. When so closed a differential pressure is applied on opposite sides of the valve head and this difference in pressure assists to keep the valve closed.

A motor is provided for actuating the valve head. In the particular embodiment of the invention illustrated in Fig. 4, the motor includes a steam operated piston 52 connected to the valve head by a thrust rod 53 and ball and socket joint 54, the latter permitting a tight seating of the valve head upon the valve seat independently of a change of position of the parts due for example to different or unequal expansion and contraction of the several parts by reason of the temperatures to which the parts are subjected in the separator. Means are provided for moving the valve head, so as to open and close the stop valve. These means may be varied. As illustrated, a piston 52, subjected to steam pressure, is utilized. In the form illustrated in Fig. 4, the piston 52 is provided with a supplemental piston 55 carrying rings 56 moving in a cylinder 57 which serves as a guide, the cylinder 57 being open to atmosphere as at 57ª. The supplemental piston 55 being of smaller diameter than the piston 52, the pressure urging the piston 52 in the valve opening direction is a differential pressure proportional to the difference in area or difference in cross sections of the two pistons. By reason of the greater outward pressure on piston 52, the stop valve is opened and kept open ready to act on emergency. Steam is supplied to move the piston 52 to close the stop valve by means of a steam passageway 58 which passes thru the center of the thrust rod 53.

Steam is supplied to return the piston thru port 62, thus filling the chamber 63. With the parts in the position shown in Fig. 4, the two steam pressures on opposite sides of the piston 52 keep the piston in the position at the right, owing to the greater area under pressure on the front of the piston.

Means are provided controlled by the float for permitting the steam to enter to move the piston toward the left for closing the stop valve. As illustrated, the rod 47 attached to the float mechanism, opens the valve 64 so as to permit the steam inside the piston chamber to escape thru passage 65 at 66, the passage 65 being larger than the inlet 62. The valve 64 is shown pressing against the valve seat. A spring 67 returns the valve.

The means for moving the valve from the float may be varied, but as illustrated the rod 47 carries at its upper end an eye 68 which engages a pin 69 at one end of the lever 70, the other end 71 of which when the lever is rocked by the upward movement of the float, engages a head 72 thus opening the valve 64 and allowing the steam to escape thru passages 65 and 66. The valve spring 67 is thus compressed and ready to return the valve when the float drops.

Means are provided whereby the float will permit the steam motor to act to shut off the steam only under emergency conditions, when water accumulates too rapidly in the separator and would be liable to pass on to the engine.

Normally the float moves between the positions shown between 32ª and 32 without actuating the mechanism controlling the motor for the stop valve. The lost motion connection or eye 68 ensures this operation.

But when the float 32 owing to a large additional flow of water moves into the position with its axis at 32ᵇ, the lever 70 is rocked and the valve 64 opened, thus causing the steam to move the piston 52 so as to shut off the valve. This motion is permitted without closing the water discharge valve 14, the slot 42 having a lost motion portion at its upper end (see Fig. 3) which permits the float to rise the necessary distance for opening the valve 64, before the pin 40 strikes the end 42ª of the slot.

The stop valve having been closed and the engine thus stopped without damage, the water runs out of the separator, thru the discharge opening 12, past the valve 14, which remains open until the float having dropped to its lowermost position has moved the link 37, so as to close the valve 14.

To return the valve head 51 to the open position shown in Fig. 4, means are provided which are independent of the float for equalizing the pressure between both sides of the valve head so as to equalize the pressure between the inside of the pipe 3 and the inside of the separator body. As illustrated, I make use of a by-pass for the purpose consisting of a passageway 75 which may be closed and opened at one end by a plug valve 76 operated by a hand wheel 77 passing thru a stuffing box carried by the wall of the tank. This passageway 75, when the valve 76 is opened, communicates with the inside of the tank; the other end of the passageway at 78 communicates with the inside of the pipe 3 so that when the plug 76 is opened, the pressure is equalized at both sides of the valve 50. The excess steam pressure on the front of the piston 52, will then move the piston to the right, so as to open the stop valve.

The passage 53 may be blown out by moving handle 79 to the right. The handle 79 is attached to shaft 80 to which shaft there is secured a finger 81 which when moved toward the right, strikes pin 82 and opens the valve 61. Steam rushes out into the atmosphere thru 59, thus blowing out the passage 53. This also serves to test the presence of ample steam supply for closing the valve. The valve 61 is pressed toward its seat by spring 83.

Moving the handle 79 to the left opens the valve 64 and permits one to initiate the closing movement of the stop valve by hand.

The valve head 50 is provided with a flange which enters the steam discharge pipe opening before the piston 52 completes its stroke in closing the valve.

The electromagnetic mechanism for controlling the stop valve motor forms no part of this invention, but it is illustrated for completeness. An electromagnet 84 when energized as by closing a switch automatically when the engine starts to race, will attract an armature on bell crank 85, thus raising the latch 86 out of contact with the spring-pressed arm 87, so that the spring 88 will move the arm 87, thus rocking the shaft 80 and fingers 81 to open valve 64. The steam motor will then close the stop valve. One can also initiate this action at a distance by raising the rod 90 attached to the bell crank 85 at 91 and carrying a collar 92 so that an upward movement of the rod 90 will release the latch 86.

In the form of the invention illustrated in Figs. 7, 8, 9 and 10, two floats are used, one for controlling the operation of the water discharge valve and the other for controlling the motor which closes the stop valve for the steam and which acts to shut off the steam only under emergency conditions when water accumulates too rapidly in the separator and would be liable to pass on to the engine. The steam enters the separator 100 by means of pipe 101 and leaves the separator on its way to the engine by pipe 102, as in the separator illustrated in the prior figures, pipe 102 being secured to the head of the separator by bolts 103. A steam stop valve 104 closes the mouth 105 of the steam discharge pipe 102 on emergency, i. e. when the water level in the separator has risen so as to move float 106 into the position illustrated. The float 106 by means of connections 107, 108 withdraws valve rod 109 so as to open valve port 110, permitting the steam in front of piston 111 which enters at 112 to escape at 113, thus lowering the pressure in front of the piston. Steam which enters at 114 under pressure before the steam stop valve closed, is supplied to rear of piston 111 at 115. So the piston 111 moves toward the left to shut off the steam supply. A counterweighted separate float 116 controls the weighted arm 117 which in turn actuates link 118 and thus opens the water discharge valve as in the preceding figures.

The above description will make the operation and construction of the invention clear.

It will be understood that the invention is not limited to details and that numerous changes may be made in the position and construction of the parts in carrying it into effect without departing from the principle thereof.

What we claim and desire to secure by Letters Patent is:

1. In a separator the combination with the separator body adapted to receive steam and water, a steam supply pipe connected with said body, a steam outlet pipe also connected with said body for supplying steam as required, of a float in the separator body, a water discharge valve for the separator, a stop valve for stopping the flow of steam, a power actuated device separate from the float for actuating said stop valve, the means for supplying power being within the separator, and means within the separator controlled by the float for starting said device for actuating the stop valve.

2. In a separator having steam inlet and steam outlet pipes connected with said separator, for supplying steam as required, a discharge valve for the water of condensation from said separator, a float, a stop valve for shutting off the supply of steam, power means separate from the float for closing said stop valve, the means for supplying power being within the separator, and means within the separator controlled by said float for controlling the starting of said motor.

3. In a steam separator having steam inlet and steam outlet pipes connected with said separator, for supplying steam, a discharge valve for the water of condensation from said separator, a float, connections between said float and said discharge valve, a stop valve for shutting off the supply of steam, a motor separate from said float for closing said stop valve, the means for supplying power for said motor being within the separator, and means within the separator controlled by said float for controlling the starting of said motor.

4. In a separator the combination with the separator body of a gas supply pipe connected with the separator, a gas discharge pipe also connected with the separator, a float in the separator body, a fluid discharge valve for the separator, a stop valve for stopping the flow of gas, a motor separate from said float for actuating said valve, power supplying means for said motor located within the separator and means within the separator and controlled by the float for controlling said motor for closing the stop valve.

5. In a separator having a tank and steam inlet and steam outlet pipes connected with said tank for supplying steam, a discharge valve for discharging the water from said tank, a float, a stop valve for shutting off the supply of steam, a motor separate from the float for closing said stop valve, power supplying means for said motor located within the separator, said stop valve and motor being carried by the tank and means within the separator controlled by said float for controlling said motor.

6. A steam separator including a tank and steam inlet and steam outlet pipes connected with said tank for supplying steam as required, a discharge valve for discharging the water from said tank, a float, connections between said float and said discharge valve, a stop valve for shutting off the supply of steam, power supplying means separate from said float for closing said stop valve, said stop valve and means being within the separator and means within the separator controlled by said float for controlling the operation of said means for closing the stop valve.

7. A separator including the combination of a separator tank and steam inlet and steam outlet pipes connected with said tank for supplying steam as required, of a float in the tank, a stop valve for closing the steam outlet pipe and shutting off the supply of steam, a motor for closing said valve, means within the separator for supplying steam to said motor, means for controlling the flow of steam, and connections between the float and said means for controlling the flow of steam, the float thereby controlling the motor and actuating the stop valve when the incoming flow of water to the separator exceeds a predetermined amount.

8. A separator including the combination with the separator tank of steam inlet and steam outlet pipes connected with said tank for supplying steam as required, a float in the tank, a stop valve for shutting off the supply of steam, a motor separate from the float for closing said stop valve, means for supplying steam to said motor, a valve controlled by the float for controlling the flow of steam, connections between said valve and float, the float thereby controlling the motor and actuating the stop valve when the incoming flow of water to the separator exceeds a predetermined amount.

9. In a separator, the combination with a separator tank, interposed in a series in the steam line, of a float in the tank, a stop valve for shutting off the supply of steam, a motor separate from the float and including a piston and steam chamber in which the piston works, a valve controlled by the float for controlling the flow of steam, connections between said valve and float, thereby permitting the motor to actuate the stop valve when the incoming flow of water to the separator exceeds a predetermined amount and means independent of the float for controlling the return of the motor so as to open the stop valve.

10. The combination with a separator tank and an engine, of pipes for supplying steam to, and discharging it from, the tank on its way to the engine, of a float in the tank, a stop valve for shutting off the supply of steam, a motor including a piston and steam chamber in which the piston works, a valve for controlling the flow of steam, and mechanical connections between the float and the said controlling valve, thereby permitting the motor to actuate the stop valve when the incoming flow of water into the separator exceeds a predetermined amount.

11. The combination with a steam line, an engine and a separator tank connected with the steam line so as to receive and discharge the steam to the engine, of a float in the tank, a stop valve for shutting off the supply of steam, a motor including a steam chamber and a piston working in said chamber, means for supplying steam to said chamber, means for discharging steam therefrom, a valve controlled by the float for controlling the discharge of steam from the steam chamber, connections between said float and valve, thereby permitting the motor to actuate the stop valve when the incoming flow of water to the separator becomes too great.

12. The combination with a steam line, an engine and a separator tank adapted to receive the water from the inlet steam pipe, said separator tank connected with the steam line so as to receive and discharge the steam on its way to the engine, of a float in the tank, a discharge valve for the intercepted water, controlled by said float, a stop valve for shutting off the supply of steam, a motor including a steam chamber and a piston working in said chamber, means for supplying steam to said chamber, means for discharging steam therefrom, a valve controlled by the float for controlling the discharge of steam from the steam chamber, and connections between said float and valve, thereby permitting the motor to actuate the valve when the incoming flow of water to the separator exceeds a predetermined amount.

13. In a separator the combination with a separator tank, a pipe for supplying steam to the tank, a pipe discharging steam from the tank as required, of a float in the separator tank, a discharge valve for discharging intercepted water from said tank, controlled by said float, a stop valve for shutting off the supply of steam, a motor including a steam chamber and a piston working in said chamber, means for supplying steam to said chamber, means for discharging steam therefrom, a valve for controlling the discharge of steam from the steam chamber of the motor, connections between said controlling valve and said float, said connections including a lost-motion member, whereby the motor is permitted to actuate the stop valve by means of the float after it has reached a predetermined level.

14. The combination with an engine, of a separator tank, a pipe supplying steam to the tank, a discharge pipe for the steam entering said tank, said discharge pipe supplying steam to the engine, of a float in the tank, a stop valve for shutting off the flow of steam, a motor for closing said stop valve, mean for supplying steam to said motor, a controlling valve controlled by the float for controlling the flow of steam, connections between said float and valve, the float thereby controlling the motor and actuating the stop valve when the incoming flow of water to the separator exceeds a predetermined amount, and a by-pass valve connected to the steam outlet pipe.

15. In a separator the combination with the separator tank interposed in series in the steam line, of a float in the tank, a stop valve for shutting off the supply of steam, a motor including a piston and steam chamber in which the piston works, a valve for controlling the exhaust of steam at one side of the piston mechanical connections between the float and the valve permitting the motor to actuate the stop valve when the incoming flow of water into the separator exceeds a predetermined rate, and means independent of the float for controlling the return of the stop valve.

16. In a separator the combination with the separator connected in series in the steam line, of a float in the separator, a stop valve for shutting off the supply of steam, a motor including a piston and steam chamber in which the piston works, for actuating the stop valve, means for supplying steam to one side of the piston, means for supplying steam to the other side of the piston, an exhaust valve for discharging steam from the first mentioned side of the piston and connections between the float and the said exhaust valve permitting the piston to actuate the stop valve when the incoming flow of water into the separator exceeds a predetermined rate.

17. In a separator the combination with the separator tank, connected in series in the steam line, of a float in the tank, a stop valve for shutting off the supply of steam, a motor including a piston and steam chamber in which the piston moves, a steam discharge valve for one side of the piston, means for controlling said valve by the float, so as to permit the closing of the stop valve and means for controlling the said valve by hand to close the stop valve.

18. In a separator the combination with the separator tank connected in series in the steam line, of a float in the tank, a stop valve for shutting off the supply of steam, a motor including a piston and steam chamber in which the piston moves, a steam discharge valve for the front side of the piston, means for controlling said valve by a float, so as to permit the closing of the stop valve and means for controlling the said valve by hand to close the stop valve, a by-pass between the tank and the steam outlet pipe and means for controlling said by-pass.

19. In a separator the combination with the separator tank, of a float in the tank, a stop valve for shutting off the supply of steam, a motor carried by the tank including a piston and steam chamber in which the piston moves, a hollow connecting rod between the piston and the stop valve, thereby permitting the passage of steam thru the hollow connecting rod to the rear of the piston, means for supplying steam to the front of the piston, a steam exhaust valve for the steam chamber and connections between the float and the steam exhaust valve thereby permitting the piston to actuate the stop valve.

20. In a separator the combination with the separator tank of a float in the tank, a stop valve for shutting off the supply of steam, a motor carried by the tank including a piston and steam chamber in which the piston moves, said stop valve being loosely connected with said piston and means whereby the movement of the float controls the operation of the motor so as to permit the actuation of the stop valve.

21. In a separator the combination with the separator tank of a float in the tank, a stop valve for shutting off the supply of steam, a motor carried by the tank including a piston and steam chamber in which the piston moves, a connecting rod between said piston and said stop valve, a universal joint between said connecting rod and said stop valve and means whereby the movement of the float controls the operation of the motor so as to permit the actuation of the stop valve.

22. In a separator the combination with the separator tank of a float in the tank, a discharge valve for the intercepted water, a weight for opening said discharge valve and connections between said float and said weight for initially moving said weight past its dead center position, thereby permitting the weight to thereafter fall and open said discharge valve.

23. In a separator the combination with the separator of a float in the tank, a discharge valve for the intercepted water, a pivoted weight for opening said discharge valve, a counterweight for said float, connections between said float and the pivoted weight, whereby the upward movement of the float raises the weight, a link connected to said discharge valve and means connecting said link and pivoted weight whereby the falling movement of the weight actuates said link to open the discharge valve.

24. In a separator the combination with the separator tank of a float in the tank, a discharge valve for the intercepted water, a pivoted weight for opening said discharge valve, connections between said float and the pivoted weight, whereby the upward movement of the float raises the weight, a link connected to said discharge valve, said link, weight and float moving about a common center, and a pin and slot connection between said weight and said link whereby the downward movement of the weight actuates said link to open the discharge valve.

25. In a separator the combination with the separator tank of a float in the tank, a discharge valve for the intercepted water, a pivoted weight for opening said discharge valve, connections between said float and the pivoted weight, whereby the upward movement of the float raises the weight, a link connected to said discharge valve, said link, weight and float moving about a common center, and a pin and slot connection between said weight and said link whereby the downward movement of the weight actuates said link to open the discharge valve, a counter weight connected with the far end of the float-carrying arm, a pin and slot connection between the arm carrying the counterweight and the pivoted weight, whereby the downward movement of the float restores the pivoted weight, thus permitting the pivoted weight to close the discharge valve.

26. In a separator the combination with the separator tank, of a float in the tank, a discharge valve for the water of condensation, a pivoted weight to open said discharge valve, connections between said float and the pivoted weight whereby the upward movement of the float raises the weight, a link connected to said discharge valve, a pin and slot connection between said weight and said link whereby the downward movement of the weight actuates said link to open the discharge valve, a counter weight for the float, an arm carrying said counter weight, a pin and slot connection between said arm and the pivoted weight, said slot being provided with a lost motion portion, a steam cut-off valve, connections including a lost-motion member, between said float and said steam cut-off valve, the parts being so constructed and arranged that the upward movement of the float first actuates the weight which in turn when falling opens the discharge valve, a further movement of the float initiating the movement of the motor for closing the cut-off valve without moving the pivoted weight.

27. In a separator the combination of a separator body and gas inlet and outlet pipes connected with said body, a stop valve for the gas, a float in the separator body, a motor separate from the float for closing said valve, power supplying means within the separator for supplying power to said motor, connections within the separator between said float and motor permitting operation of the motor under emergency conditions when fluid accumulates too rapidly in the separator, and hand-operated means, independent of the float, for controlling the return of the motor and opening of the stop valve.

28. The combination with a separator tank and engine of steam inlet and steam outlet pipes connected with said tank for supplying steam to the engine, of a float in the tank, a stop valve for shutting off the supply of steam, said valve arranged inside of said tank, a motor carried by the tank for closing said stop valve, means for supplying steam to said motor, and a valve controlled by the float for controlling the flow of steam, connections between the float and the valve, thereby controlling the motor and actuating the stop valve when the incoming flow of water to the separator exceeds a predetermined amount.

In testimony whereof, we have signed our names to this specification.

OSCAR H. LUDEMAN.
EDWIN H. LUDEMAN.